US012783173B2

(12) United States Patent
Doddaiah et al.

(10) Patent No.: US 12,783,173 B2
(45) Date of Patent: Nov. 3, 2026

(54) DEEP LEARNING USING A READ SKIP MASK COMMAND

(71) Applicant: Dell Products L.P., Round Rock, TX (US)

(72) Inventors: Ramesh Doddaiah, Westborough, MA (US); Xiangping Chen, Sherborn, MA (US); Jonathan Ichael Krasner, Coventry, RI (US)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 19/030,303

(22) Filed: Jan. 17, 2025

(65) Prior Publication Data

US 2026/0211580 A1 Jul. 23, 2026

(51) Int. Cl.
*G06F 3/06* (2006.01)
*G06N 5/04* (2023.01)

(52) U.S. Cl.
CPC .......... *G06F 3/0659* (2013.01); *G06F 3/0604* (2013.01); *G06F 3/067* (2013.01); *G06F 3/0673* (2013.01); *G06N 5/04* (2013.01)

(58) Field of Classification Search
CPC ...... G06F 3/0659; G06F 3/0604; G06F 3/067; G06F 3/0673; G06F 3/0625; G06F 3/0655; G06F 3/0658; G06N 5/04
See application file for complete search history.

(56) References Cited

U.S. PATENT DOCUMENTS

| | | | | |
|---|---|---|---|---|
| 2021/0281662 | A1* | 9/2021 | Mathur | G06F 9/45558 |
| 2021/0357119 | A1* | 11/2021 | Bruce | G06F 3/061 |
| 2021/0406782 | A1* | 12/2021 | Nakayama | G06N 20/20 |
| 2023/0116755 | A1* | 4/2023 | Linnen | G06N 3/10 711/114 |
| 2024/0276357 | A1* | 8/2024 | Kumar | H04W 8/22 |
| 2024/0281246 | A1* | 8/2024 | Laffra | G06F 8/72 |
| 2025/0045597 | A1* | 2/2025 | Fujishiro | G06N 20/00 |

OTHER PUBLICATIONS

"Maxtor Atlas 10K III Product Manual", Maxtor Corporation, pp. 5-119; https://www.seagate.com/staticfiles/maxtor/en_us/documentation/manuals/atlas10k_iii_manual.pdf (Year: 2002).*

* cited by examiner

*Primary Examiner* — Michael Krofcheck
(74) *Attorney, Agent, or Firm* — Chamberlain, Hrdlicka, White, Williams & Aughtry; Aly Z. Dossa

(57) ABSTRACT

A method for operating a model on a storage array includes receiving, from a host, a registration for the model to cause the model to be stored in the storage array. The method also includes receiving a command and, in response to receiving the command, activating the model. The method further includes transmitting a tag to notify the host that the model is activated. In addition, the method includes receiving a prompt from the host that includes an identifier for relevant data stored on the storage array and instructions to form an inference based on the relevant data. Moreover, the method includes forming, based on the prompt, the inference using the model, where the model is executed on a computing resource of the storage array and the relevant data is used as an input for the model. Further, the method includes transmitting the inference to the host.

20 Claims, 5 Drawing Sheets

DEEP LEARNING USING A READ SKIP MASK COMMAND

BACKGROUND

Artificial Intelligence (AI) models including deep learning inference models perform inference tasks on large amounts of data. The large data sets to be used with the inference tasks are stored on storage arrays by users. The AI models are trained by customers on host devices and when the users wish to begin using the AI models the large data sets need to be transmitted to the host devices to run on the AI models.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

DETAILED DESCRIPTION

Traditionally, after an artificial intelligence (AI) model is trained, the trained model is provided to a host. Then, the host can perform inference tasks using the trained AI model. However, performing inference tasks may necessitate the transfer of data from a location outside of the host, such as a storage array. When the AI model is run on the host, these data sets, which may be very large, must be transmitted to the host from the storage array to generate an inference on the data by the AI model. Because these large data sets may include billions of data points, transmitting the large data sets can lead to delays and undue burden on computing and networking resources. Further, the hosts must provide computing power and memory when the executing the AI model. When the AI model has a billion parameters, the host will need increased computing resources to generate the thousands of inferences by the AI model on the large data sets. During the inference task, computing resources of the storage array are not leveraged due to the inferencing being executed on the hosts.

For at least the reasons discussed above, a different approach/framework may be beneficial for inferences using AI models.

Embodiments disclosed herein relate to leveraging computer resources and memory of the storage array to execute the AI models on the storage array. The AI models are outsourced from the host and are stored on the storage array. The host then communicates with the storage array using modified commands that include instructions to register and store the AI models in the storage array, activate the AI model, retrieve data stored on the storage array to use as an input on the model, and execute the model on computer resources of the storage array to produce an inference. The inference is then transmitted to the host. Multiple AI models are stored on the storage array letting the host run the model best suited for the inference task. Benefits of the disclosure include reducing the transfer of data, that can range up to terabytes or even petabytes, that is stored on the storage array. This reduces the power consumption through a reduction in the use of computing resources across the storage array. Further the disclosure leverages the computing resources of the storage array, that can include powerful data processing units that include specialized functionality to efficiently execute inferencing tasks. Running the inference task on the storage array also leverages the fault tolerant and distributed structure of the storage array.

The following describes various embodiments disclosed herein.

Figure 1A:
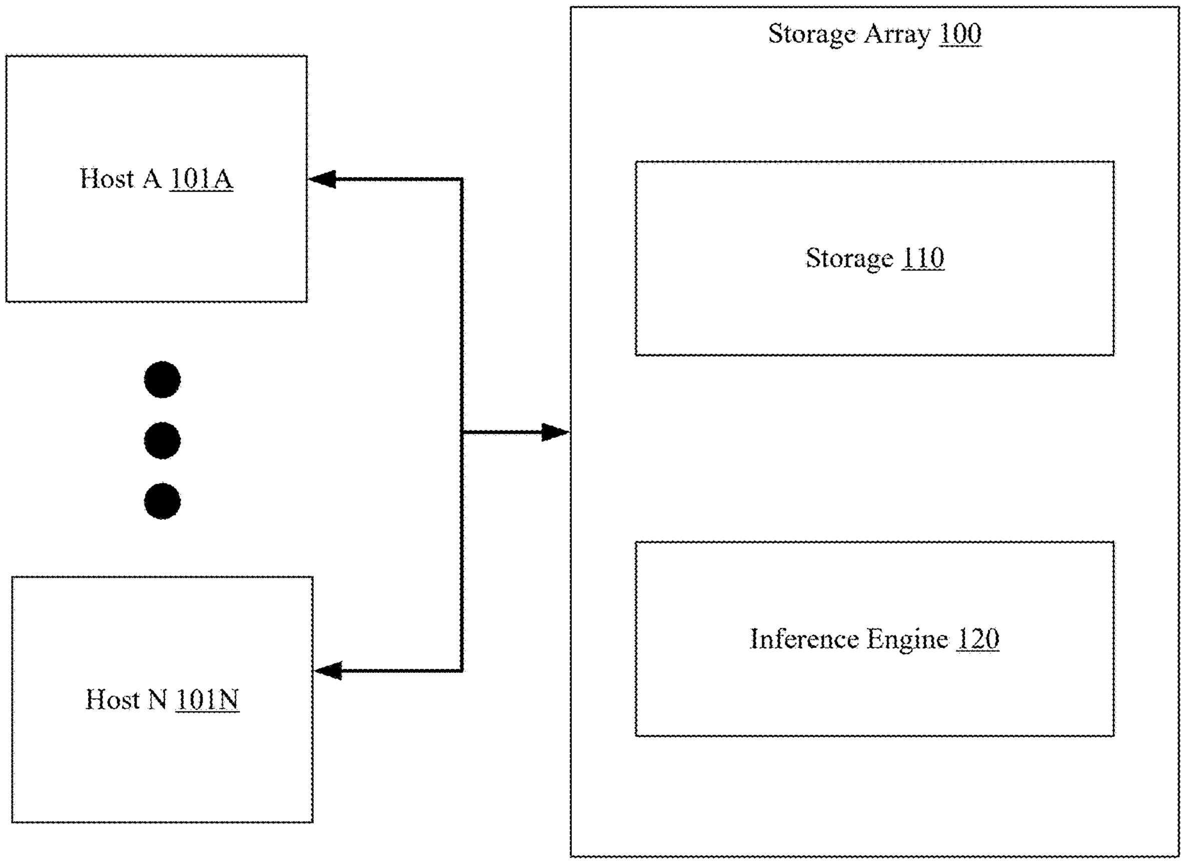
FIG. 1A shows a diagram of a system including a storage array in accordance with one or more embodiments disclosed herein.

FIG. 1A shows a diagram of a system including a storage array (100) in accordance with one or more embodiments disclosed herein. The system includes the storage array (100) and a plurality of hosts (101A, 101N). Each of these components shown in FIG. 1 is described below.

The system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 1 may be connected via a network fabric (not shown). A network fabric refers to the interconnected topology and structure of network elements, e.g., switches, routers, and links, which work together to provide data transmission within between the components. The network fabric may be implemented using a spine-leaf topology, where every leaf switch connects to each spine switch. In one or more embodiments, the hosts (101A, 101N) are connected to the storage array (100) by a storage area network (SAN). The SAN is a high-speed network that allows for multiple hosts to access the storage array (100). The SAN uses a network infrastructure specifically designed for high-speed data transfer between servers and storage devices. Each host may be equipped with a host bus adapter card to connect to a SAN switch using a fibre channel. Those skilled in the art will appreciate that any other type of network (or network topology) may be used without departing from the disclosure.

The hosts (101A, 101N) include any number of hosts (e.g., 101A through 101N). For ease of understanding, the following discussion of hosts (101A, 101N) will be described with reference to one of the hosts, the host A (101A). It should be understood that the following discussion may apply to any host such as host N (101N). The host A (101A) is connected to the storage array (100). The host A (101A) is configured to interact with AI models, such as by training AI models, receiving AI models, using AI models, processing inferences from AI models, etc. In one or more embodiments, the host A (101A) is a device that trains the AI models. For example, the host A (101A) may include infrastructure nodes that have more available resources than other devices and thus may be able to complete more resource-intensive tasks or perform tasks more quickly than other devices may be capable of with respect to training the AI models. In one or more embodiments, the host A (101A) is operatively connected to other devices and the AI models are transmitted to the host A (101A) from the other devices.

Figure 2:
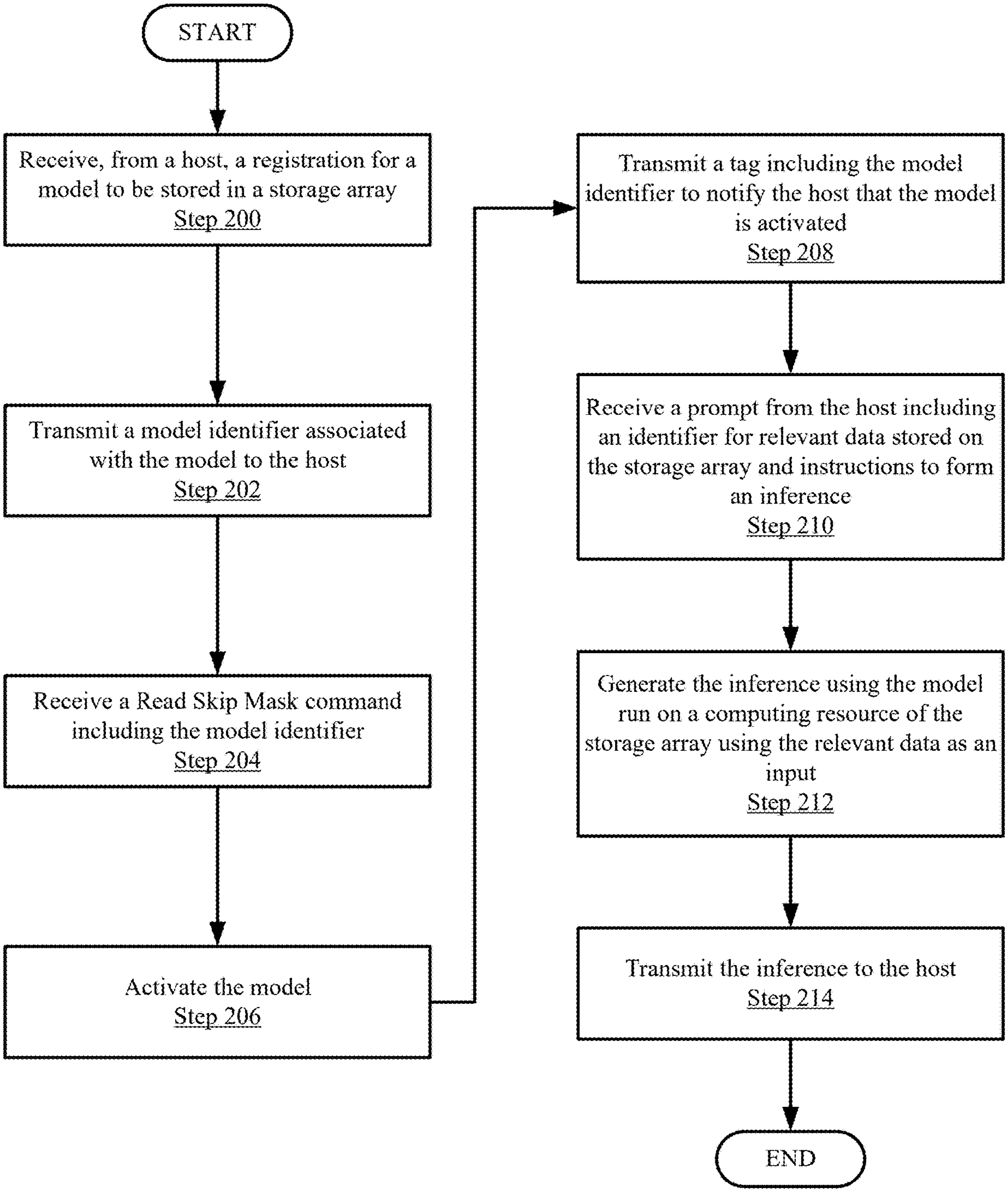
FIG. 2 shows a flowchart for a method for operating a model on a storage array in accordance one or more embodiments disclosed herein.
Figure 3:
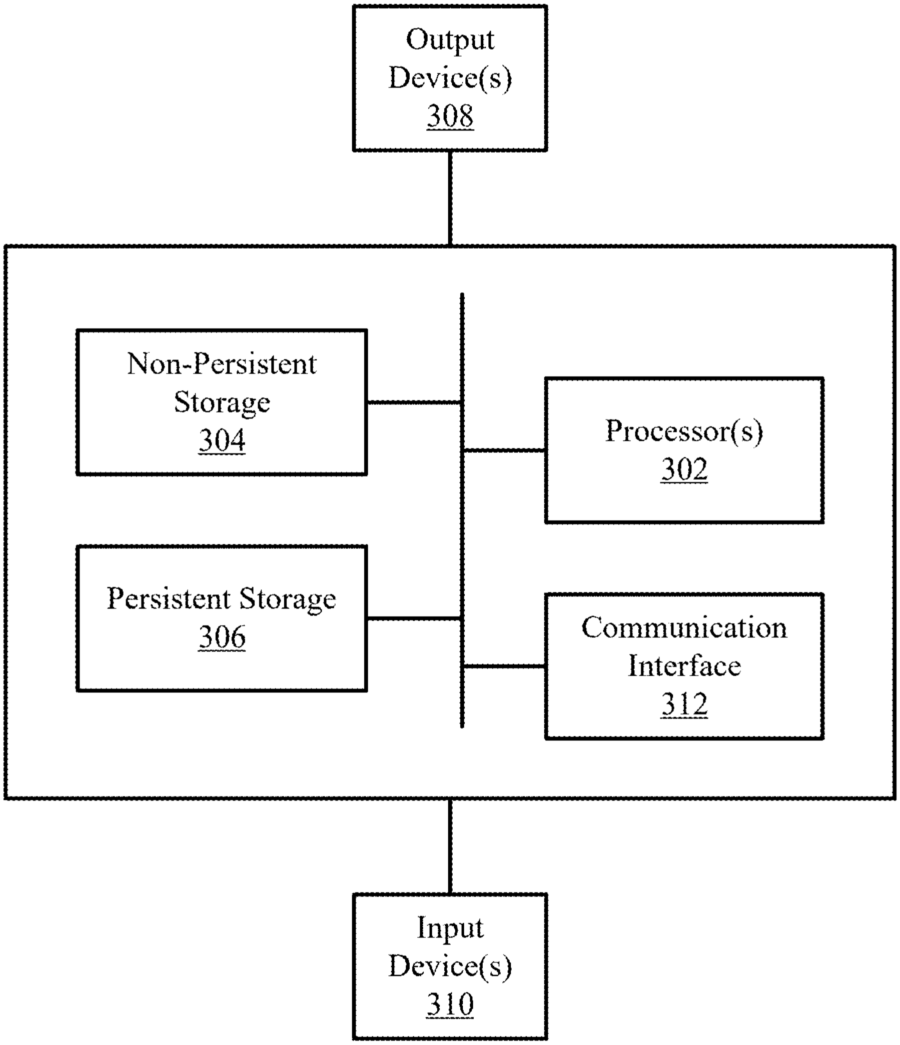
FIG. 3 shows a diagram of a computing device in accordance with one or more embodiments disclosed herein.

In one or more embodiments, the hosts (101A, 101N) may be implemented as one or more computing devices (see e.g., FIG. 3). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the hosts (101A, 101N) described throughout this application and/or all, or a portion thereof, of the method illustrated in FIG. 2.

In one or more embodiments, the hosts (101A, 101N) are implemented as a logical device(s) (e.g., a virtual machine). Each logical device may utilize the computing resources of any number of computing devices and thereby provide the functionality of the hosts (101A, 101N) described throughout this application and/or all, or a portion thereof, of the method illustrated in FIG. 2.

In one or more embodiments, the storage array (100) includes the functionality to store data for a plurality of host (101A, 101N). The storage array (100) also includes the functionality to store models (e.g., AI models). The storage array may include both persistent and non-persistent memory as described below. The storage array (100) includes a storage (110) which includes the memory discussed above and an inference engine (120) which includes computer resources that are leveraged to execute models on the storage array. Further, the storage (110) is discussed in further detail below with reference to FIG. 1B and the inference engine (120) is discussed in further detail below with reference to FIG. 1C.

In one or more embodiments, the storage array (100) may be implemented as one or more computing devices (see e.g., FIG. 3). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the storage array (100) described throughout this application and/or all, or a portion thereof, of the method illustrated in FIG. 2.

In one or more embodiments, the storage array (100) is implemented as a logical device(s). Each logical device may utilize the computing resources of any number of computing devices and thereby provide the functionality of the storage array (100) described throughout this application and/or all, or a portion thereof, of the method illustrated in FIG. 2.

Figure 1B:
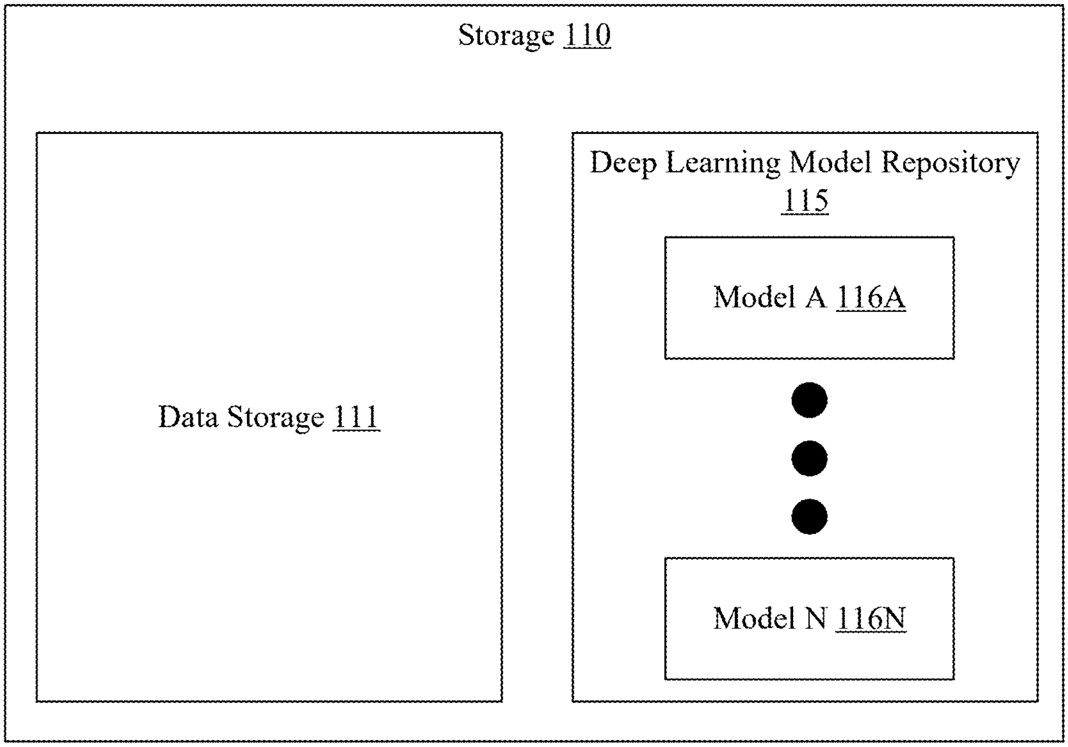
FIG. 1B shows a diagram of a storage of the storage array in accordance with one or more embodiments disclosed herein.

Turning to FIG. 1B, FIG. 1B shows a diagram of the storage (110) of the storage array (100) in accordance with one or more embodiments disclosed herein. In one or more embodiments, the storage (110) may be implemented as a file store. When implemented as a file store, the storage (110) stores data as files and manages the files using a file system. The file system may organize the files within a hierarchy using, for example, directories and/or folders. In another embodiment, the storage (110) may be implemented as an object store. When implemented as an object store, the data is stored as discrete units called objects (instead of files). Each object includes the data itself, metadata that describes the data, and a unique identifier, allowing for efficient retrieval and organization.

The storage (110) includes a data storage (111) and a deep learning model repository (115). The storage (110) may utilize, to store data, volatile storage, non-volatile storage, or any combination thereof to store the aforementioned data. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), and persistent memory (PMEM).

The data storage (111) includes the functionality to store large data sets (e.g., relevant data) for the host that will be used to make inferences with AI models. In one or more embodiments, the large data sets are stored in a way that the location of individual data files of the large data set can be tracked using logical block addressing. The data storage (111) is accessible by the inference engine (120) to allow the inference engine to retrieve the relevant data when the model is being executed on the inference engine (120). For example, if a user wishes to use an AI model to make an inference about a set of data, the inference engine can access the set of data from the data storage (111).

In one or more embodiments, the deep learning model repository (115) is accessible by the host A (101A). The deep learning model repository includes the functionality to receive AI models from the host A (101A) and assign AI models a model identifier. The deep learning model repository (115) is accessible by the inference engine (120) to allow the inference engine to retrieve the model and prepare the model for inferencing.

In one or more embodiments, the deep learning model repository includes multiple models. The models include any number of models (e.g., 116A through 116N). The models discussed herein may refer to any one or combination of model A (116A), model N (116N) or another model. The models are artificial intelligence models trained on training data to perform inferences on input data to produce an output. The artificial intelligence models may be deep learning models, neural networks such as convolutional neural networks, machine learning models, or any other similar artificial intelligence model.

Figure 1C:
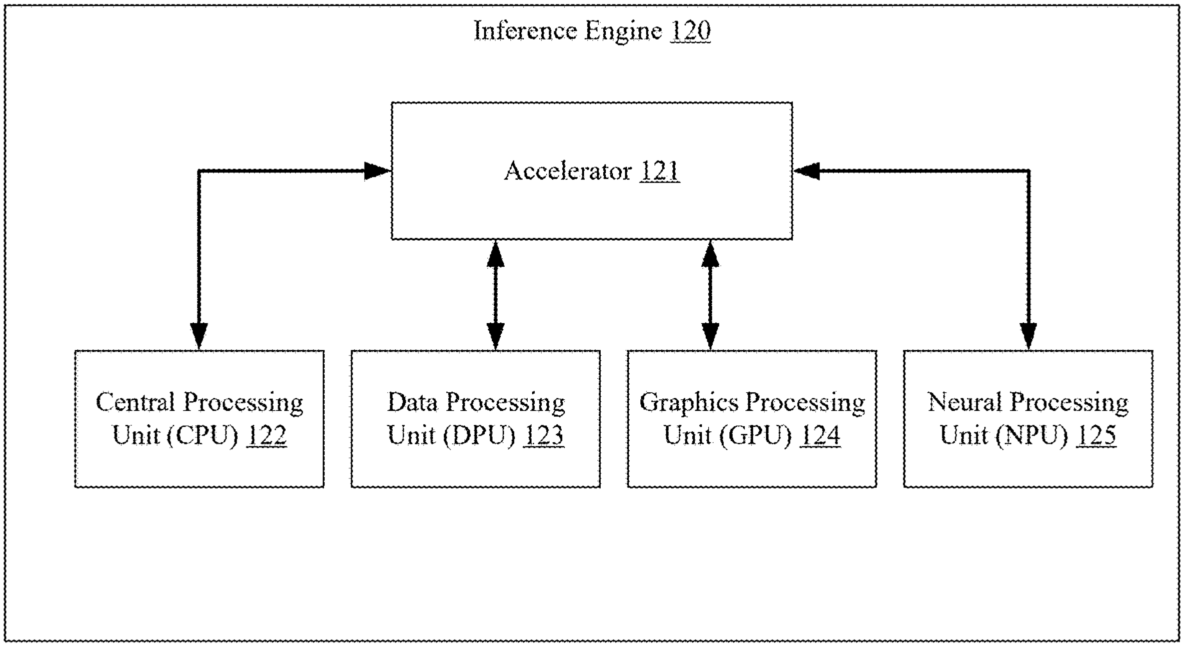
FIG. 1C shows a diagram of an inference engine in accordance with one or more embodiments disclosed herein.

Turning to FIG. 1C, FIG. 1C shows a diagram of the inference engine (120) in accordance with one or more embodiments disclosed herein. The inference engine (120) includes the functionality to execute an AI model on the storage array (100). The inference engine (120) is in the storage array (100) with the data that will be inferenced meaning the data will not need to be transferred from the storage array (100) to the host. This removes any data transmission time from the storage array (100) and frees up resources that would be needed for data transmission. In one or more embodiments, the inference engine (120) includes an accelerator (121), a central processing unit (CPU) (122), a data processing unit (DPU) (123), a graphics processing unit (GPU) (124), and a neural processing unit (NPU) (125).

Each of these components shown in FIG. 1C is described below.

In one or more embodiments, the accelerator (121) is a dedicated hardware component that is designed to improving inference performance of the CPU, the DPU, the GPU, and the NPU. In one or more embodiments, the accelerator is operatively/operably connected to the CPU, the DPU, the GPU, and the NPU and runs model optimizers on the selected computer resource to execute the model. Further, in one or more embodiments, the accelerator (121) includes a software accelerator in addition to or alternatively to the hardware accelerator. The software compression accelerator includes software that is designed to take advantage of the logical construction and/or physical construction of the CPU, the DPU, the GPU, and the NPU to perform the inference.

In one or more embodiments, the CPU (122) is an electronic component containing electronic circuitry to execute instructions of a computer program. The CPU (122) is a more generalized processor that acts as a main processor of a computing device. For AI inferencing, the CPU (122) also includes functionality to perform all or some of the method shown in FIG. 2. In one or more embodiments, the CPU (122) would be used to execute the model when a small data set is being input into the model, the storage array has a low power budget at the time of execution, real-time inference is required with low latency, or the model is simple enough to not justify using a more complex processor. While one CPU (122) is shown in FIG. 1C, multiple CPUs being used in the inference engine (120) is contemplated. The CPU (122) can implement additional functionality without departing from the disclosure.

In one or more embodiments, the DPU (123) is a specialized electronic component that includes one or more network interfaces and is designed to offload various networking tasks (e.g., packet processing, encryption, data compression, and network virtualization) that would normally be handled by the CPU (122). The DPU (123) can also enhance the performance of AI models executed on the DPU. For AI inferencing, the DPU (123) also includes functionality to perform all or some of the method shown in FIG. 2. The DPU (123) would be used to execute the model when acceleration of the data processing tasks of the model is needed especially with large volumes of data. The DPU (123) may be used when fast data transfer in the model is crucial to the success of the inference. While one DPU (123) is shown in FIG. 1C, multiple DPUs being used in the inference engine (120) is contemplated. The DPU (123) can implement additional functionality without departing from the disclosure.

In one or more embodiments, the GPU (124) is a specialized electronic component that includes multiple cores (also referred to as GPU cores) arranged to enable high-performance parallel computing tasks. The GPU (124) may also include large amounts of volatile memory to support the parallel processing of the multiple GPU cores. For AI inferencing, the GPU (124) also includes functionality to perform all or some of the method shown in FIG. 2. The GPU (124) would be used to execute the model when processing of large data sets needs to be performed quickly. The GPU (124) is ideal when the model is a complex deep learning model. While one GPU (124) is shown in FIG. 1C, multiple GPUs being used in the inference engine (120) is contemplated. The GPU (124) can implement additional functionality without departing from the disclosure.

In one or more embodiments, the NPU (125) is a specialized electronic component that includes processing power to perform many processes in parallel including vector multiplication. In one or more embodiments, the NPU (125) is able to perform trillions of operations per second. In one or more embodiments, the NPU (125) also uses less power and is more efficient for AI model specific tasks than the CPU (122) and the GPU (124). For AI inferencing, the NPU (125) also includes functionality to perform all or some of the method shown in FIG. 2. The NPU (125) would be used to execute the model when fast low-power AI processing is needed such as image recognition and natural language processing. While one NPU (125) is shown in FIG. 1C, multiple NPUs being used in the inference engine (120) is contemplated. The NPU (125) can implement additional functionality without departing from the disclosure.

Turning now to FIG. 2, FIG. 2 shows a flowchart for a method for operating a model on a storage array in accordance one or more embodiments disclosed herein. The method of FIG. 2 may be performed by, for example, the storage array (e.g., 100, FIG. 1). Other components of the system of FIG. 1 may perform all, or a portion, of the method of FIG. 2 without departing from the disclosure.

While the various steps in the flowchart of FIG. 2 are presented and described sequentially, one of ordinary skill in the relevant art will appreciate that some or all of the steps may be executed in different orders, may be combined, or omitted, and some or all steps may be executed in parallel.

In Step 200, the storage array receives a registration for a model to be stored in the storage array. The registration is transmitted to the storage array by a host (e.g., 101A, FIG. 1A). The registration is transmitted to the storage array using a write buffer command that is unique to the host, a user of the host, an entity associated with the host, or any other identifier. In one or more embodiments, the model is a deep learning model, a neural network such as a convolutional neural network, a large language model, or other type of artificial intelligence model. In one or more embodiments, the registration includes a static version of the model, including parameters (e.g., weights, bias, etc.) and hyperparameters (e.g., edges, connections, layers, nodes, etc.) In one or more embodiments, each of the above parameters are learnable parameters that are adjusted during training to help the model learn and make predictions. In one or more embodiments, each of the above hyperparameters may be static or adjusted during the training of the model. In one or more embodiments, the model is trained on the host. In one or more embodiments, the model is trained remote from the host and is sent to the host after training.

In one or more embodiments, the model is transmitted from the host in an open format which may include hierarchical data format 5 (.h5), PyTorch file format (.pt), Open Neural Network Exchange file format (.onnx), protocol buffer file format (.pb), or any other format used for models. Once the storage array receives the model, the model is stored in a storage such as a deep learning model repository (e.g., 115, FIG. 1B). The model may be stored in the same standard format as the model is transmitted. The storage where the model is stored may be a non-volatile storage.

In Step 202, the storage array transmits a model identifier associated with the model to the host. After the model is stored, the storage array creates a model identifier for the model. In one or more embodiments, the model identifier may include a location of the model in the storage array and metadata associated with the model. The model identifier identifies the model from other models stored on the storage array. In one or more embodiments, the model identifier is transmitted to the host to confirm the model is stored on the storage array and to be used as a key to activate the model on the storage array. In one or more embodiments, each model stored on the storage array has a unique associated model identifier.

In Step 204, the storage array receives a Read Skip Mask command including the model identifier. The Read Skip Mask Command is not a standard command protocol and is unique to the host, a user of the host, an entity associated with the host, or any other identifier. In one or more embodiments, the unique identifier matches the one provided in Step 200. The Read Skip Mask includes instructions to activate the model for an inference task. In one or more embodiments, the model identifier is encoded in reserve bits of the Read Skip Mask command. In one or more embodiments, the Read Skip Mask Command includes a selection of a computing resource to execute the model. The computing resources in the storage array include the CPU (e.g., 122, FIG. 1C), the DPU (e.g., 123, FIG. 1C), the GPU (e.g., 124, FIG. 1C) and the NPU (e.g., 125, FIG. 1C).

In Step 206, the storage array activates the model. In one or more embodiments, activating the model includes retrieving the model from the storage in the storage array, putting the model into inference mode, and preparing the model on the computing resource of the storage array using the inference engine (e.g., 120, FIG. 1C). When the Read Skip Mask command specifies the computing resource to be used to execute the model, the storage array may prepare the model to use that computing resource. When the Read Skip Mask does not specify the computing resource, the storage array may determine which computing resource to use based on the type of model and availability of the computing resources in the storage array. The model can be activated in any open format using data service emulations in the inference engine. The storage array then prepares the model to execute on the determined computing resource. Inference mode refers to preparing the model to accept inputs and generate outputs.

In Step 208, the storage array transmits a tag including the model identifier to notify the host that the model is activated. The tag indicates that the model is prepared to initiate an inference operation.

In Step 210, the storage array receives a prompt from the host including an identifier for relevant data stored on the storage array and instructions to form an inference. The prompt is transmitted to the storage array using a Read command. The identifier includes a logical block addressing containing the location of the relevant data in the storage array. The relevant data is stored in a data storage (e.g., 111, FIG. 1B) of the storage array. The data storage may be disk space. In response to the Read command, the storage array reads the relevant data locally based on the logical block addressing and retrieves the relevant data to be used in the inference task to form the inference.

In Step 212, the storage array forms the inference using the model run on a computing resource of the storage array using the relevant data as an input. In one or more embodiments, the storage array retrieves the relevant data from the storage using the Read command and the logical block addressing included within the Read command. The model executes on the computing resource and the relevant data is used as an input for the model and the model outputs the inference. In one or more embodiments, the inference may include an inference for every data file in the relevant data to classify each data file. For example, the inference is a binary classification that identifies whether human is present in a data set containing images taken from a surveillance camera. The model executes on each image and returns a true if a human is present in an image and a false if a human is not present in an image. In one or more embodiments, the inference is a classification that includes a confidence level of the classification represented by a percentage. Returning to the previous example, the inference on an image may be TRUE, 87% confidence. In another example, text files containing customer reviews may have the model execute an inference in a sentiment analysis to determine which reviews are positive. In one or more embodiments the inference made in the form of prediction with the relevant data used as an input. In one or more embodiments, the inference is a forecast with the relevant data as an input. In one or more embodiments, the output of the model is a true or false designation, where a threshold confidence score is used to determine whether the output is considered true or false. The forecast and prediction may include a confidence level.

In Step 214, the storage array transmits the inference to the host. In one or more embodiments, the storage array sends only the inferences to the host such as a prediction or a forecast. In one or more embodiments, the storage array sends the inferences and includes any relevant data that receives a true or other specific designation in the inference. In one or more embodiments, a Boolean value is transmitted via a message as the inference to the host and a confidence level is encoded in reserved bits of the message. The results of the inference may then be sent to a user that is operating the host.

After Step 214, the method may end.

In one or more embodiments, the host interacting with the storage array is the same or different in each interaction. For example, the unique identifier described above may be used by different hosts. In one or more embodiments, after the method ends, the method is repeated starting with the storage array receiving a second registration from the host for a second model to cause the second model to be stored in the storage array. Further in one or more embodiments, Step 204 through Step 214 may be repeated any number of times referencing the same model, which may enable multiple hosts to utilize the same model.

As discussed above, embodiments of the disclosure may be implemented using computing devices. FIG. 3 shows a diagram of a computing device in accordance with one or more embodiments disclosed herein. The computing device may include one or more computer processor(s) (302), non-persistent storage (304) (e.g., volatile memory, such as RAM, cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the disclosure, the processor(s) (302) may be an integrated circuit for processing instructions. For example, the computer processor(s) may be one or more cores or micro-cores of a processor. The computing device may also include one or more input devices (310), such as a touchscreen, keyboard, mouse, microphone, touchpad, electronic pen, or any other type of input device. Further, the communication interface (312) may include an integrated circuit for connecting the computing device to a network (not shown) (e.g., a local area network (LAN), a wide area network (WAN) such as the Internet, mobile network, or any other type of network) and/or to another device, such as another computing device.

In one embodiment of the disclosure, the computing device may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to enable the computer processor to perform one or more embodiments described herein.

The problems discussed above should be understood as being examples of problems solved by embodiments of the disclosure disclosed herein and the disclosure should not be limited only to solving the same/similar problems. The disclosure is broadly applicable to address a range of problems beyond those discussed herein.

Specific embodiments are described with reference to the accompanying figures. In the above description, numerous details are set forth as examples. It will be understood by those skilled in the art, that one or more embodiments of the present disclosure may be practiced without these specific details, and that numerous variations or modifications may be possible without departing from the scope. Certain details known to those of ordinary skill in the art are omitted to avoid obscuring the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the disclosure has been described above with respect to a limited number of embodiments, those skilled in the art, having the benefit of this disclosure, will appreciate that other embodiments can be devised which do not depart from the scope as disclosed herein. Accordingly, the scope of the disclosure should be limited only by the attached claims.

What is claimed is:

1. A method for operating a model on a storage array, comprising:
- receiving, from a host, a registration for the model to cause the model to be stored in the storage array;
- transmitting, in response to the registering, a model identifier associated with the model to the host;
- receiving a command comprising the model identifier encoded in reserve bits of the command at the storage array;
- activating, in response to receiving the command, the model, wherein activating the model comprises:
  - retrieving the model from a storage in the storage array, and
  - preparing the model on a computing resource of the storage array;
- transmitting, in response to activating the model, a tag comprising the model identifier to notify the host that the model is activated;
- receiving a prompt from the host comprising an identifier for relevant data stored on the storage array and instructions to form an inference based on the relevant data;
- forming, based on the prompt, the inference using the model, wherein the model is executed on the computing resource of the storage array and the relevant data is used as an input for the model; and
- transmitting the inference from the storage array to the host.

2. The method of claim 1, wherein, prior to registering the model, the model is trained on the host.

3. The method of claim 1, wherein the model utilizes a convolutional neural network.

4. The method of claim 1, wherein the computing resource is contained in an inference engine, the inference engine comprises a central processing unit, a data processing unit, a graphics processing unit, and a neural processing unit.

5. The method of claim 4, wherein the command further comprises a selection of at least one of the central processing unit, the data processing unit, the graphics processing unit, and the neural processing unit to be used as the computing resource.

6. The method of claim 1, wherein the inference formed by the model comprises a classification and a confidence level of the classification.

7. The method of claim 1, further comprising:
receiving, from the host, a second registration for a second model to cause the second model to be stored in the storage array.

8. A method for operating a model on a storage array, comprising:
receiving, from a host, a registration for the model to cause the model to be stored in the storage array;
transmitting, in response to the registering, a model identifier associated with the model to the host;
receiving a command comprising the model identifier at the storage array;
activating, in response to receiving the command, the model in the storage array;
transmitting, in response to activating the model, a tag comprising the model identifier to notify the host that the model is activated;
receiving a prompt from the host comprising an identifier for relevant data stored on the storage array and instructions to form an inference based on the relevant data;
forming, based on the prompt, the inference using the model, wherein the model is executed on a computing resource of the storage array and the relevant data is used as an input for the model; and
transmitting the inference from the storage array to the host.

9. The method of claim 8, wherein, prior to registering the model, the model is trained on the host.

10. The method of claim 8, wherein the model utilizes a convolutional neural network.

11. The method of claim 8, wherein the computing resource is contained in an inference engine, the inference engine comprises a central processing unit, a data processing unit, a graphics processing unit, and a neural processing unit.

12. The method of claim 11, wherein the command comprises a selection of at least one of the central processing unit, the data processing unit, the graphics processing unit, and the neural processing unit to be used as the computing resource.

13. The method of claim 8, wherein the inference formed by the model comprises a classification and a confidence level of the classification.

14. The method of claim 8, further comprising:
receiving, from the host, a second registration for a second model to cause the second model to be stored in the storage array.

15. A non-transitory computer readable medium (CRM) comprising computer readable program code, which when executed by a computer processor enables the computer processor to perform a method for operating a model on a storage array, the method comprising:
receiving, from a host, a registration for the model to cause the model to be stored in the storage array;
transmitting, in response to the registering, a model identifier associated with the model to the host;
receiving a command comprising the model identifier encoded in reserve bits of the command at the storage array;
activating, in response to receiving the command, the model, wherein activating the model comprises:
retrieving the model from a storage in the storage array, and
preparing the model on a computing resource of the storage array;
transmitting, in response to activating the model, a tag comprising the model identifier to notify the host that the model is activated;
receiving a prompt from the host comprising an identifier for relevant data stored on the storage array and instructions to form an inference based on the relevant data;
forming, based on the prompt, the inference using the model, wherein the model is executed on the computing resource of the storage array and the relevant data is used as an input for the model; and
transmitting the inference from the storage array to the host.

16. The non-transitory CRM of claim 15, wherein, prior to registering the model, the model is trained on the host.

17. The non-transitory CRM of claim 15, wherein the model utilizes a convolutional neural network.

18. The non-transitory CRM of claim 15, wherein the computing resource is contained in an inference engine, the inference engine comprises a central processing unit, a data processing unit, a graphics processing unit, and a neural processing unit.

19. The non-transitory CRM of claim 18, wherein the instructions comprise a selection of at least one of the central processing unit, the data processing unit, the graphics processing unit, and the neural processing unit to be used as the computing resource.

20. The non-transitory CRM of claim 15, further comprising:
receiving, from the host, a second registration for a second model to cause the second model to be stored in the storage array.

* * * * *